(12) United States Patent
Keating et al.

(10) Patent No.: US 9,199,304 B2
(45) Date of Patent: Dec. 1, 2015

(54) THIXOMOLDED CORE PLATES

(75) Inventors: Martin P. Keating, Plainfield, IL (US); Michael Roche, Tinley Park, IL (US)

(73) Assignee: BorgWarner Inc., Auburn Hills, MI (US)

( * ) Notice: Subject to any disclaimer, the term of this patent is extended or adjusted under 35 U.S.C. 154(b) by 612 days.

(21) Appl. No.: 13/051,294

(22) Filed: Mar. 18, 2011

(65) Prior Publication Data

US 2011/0226580 A1    Sep. 22, 2011

Related U.S. Application Data

(60) Provisional application No. 61/340,491, filed on Mar. 18, 2010.

(51) Int. Cl.
| | | |
|---|---|---|
| *B22D 17/00* | (2006.01) | |
| *B22D 19/00* | (2006.01) | |
| *F16D 13/64* | (2006.01) | |

(52) U.S. Cl.
CPC .............. *B22D 19/00* (2013.01); *B22D 17/007* (2013.01); *F16D 13/648* (2013.01); *F16D 2200/003* (2013.01); *F16D 2250/00* (2013.01); *F16D 2250/0007* (2013.01)

(58) Field of Classification Search
CPC .... B22D 17/007; B22D 19/00; F16D 13/648; F16D 2250/0007; F16D 2200/003
USPC .......................................... 164/112, 113, 137
See application file for complete search history.

(56) References Cited

U.S. PATENT DOCUMENTS 6,905,010 B2 *    6/2005    Diemer et al. ............. 192/70.14

* cited by examiner

*Primary Examiner* — Kevin P Kerns
(74) *Attorney, Agent, or Firm* — BrooksGroup

(57) ABSTRACT

One embodiment includes a friction plate and method of manufacture thereof wherein the friction plate is fabricated from a thixomolded magnesium or titanium material or alloy thereof, which is lighter than comparable steel friction plates.

26 Claims, 3 Drawing Sheets

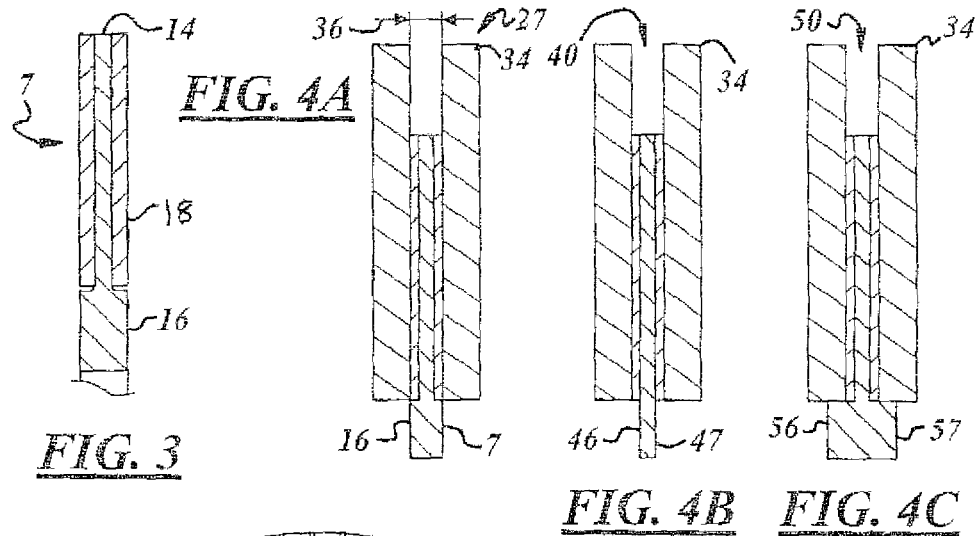
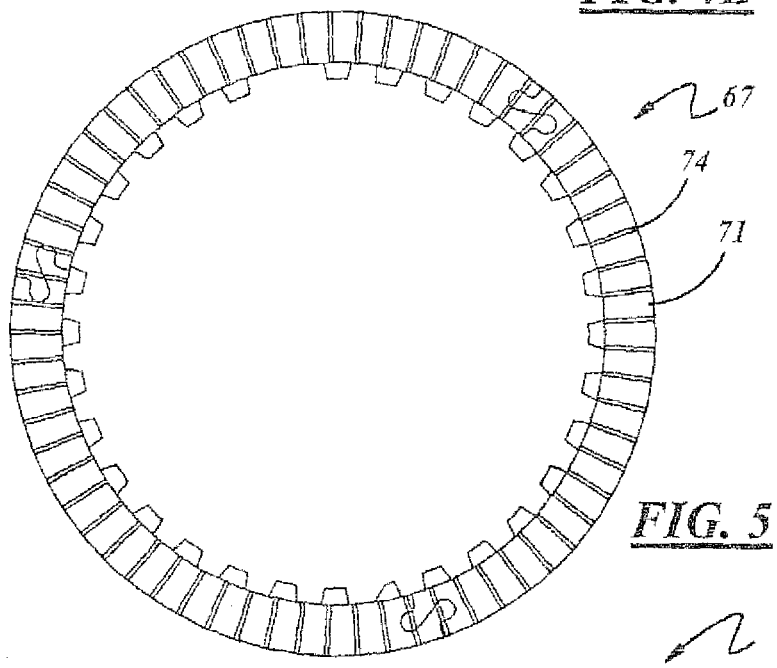
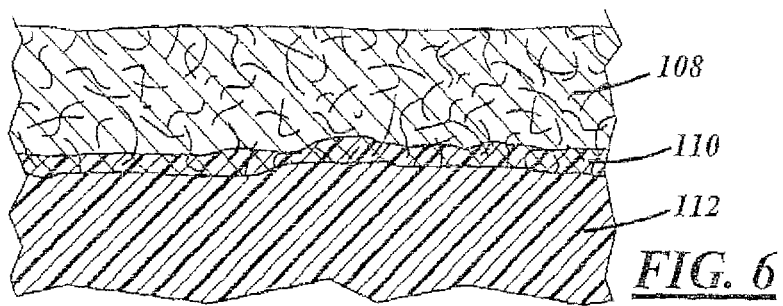

THIXOMOLDED CORE PLATES

This application claims benefit of priority to U.S. Provisional Application Ser. No. 61/340,491 filed Mar. 18, 2010.

TECHNICAL FIELD

The technical field relates to friction plates, including, but not limited to friction plates used in wet or dry friction clutch modules in automotive transmissions, such as, but not limited to passenger vehicles, motor cycles, rough terrain vehicles, and truck vehicles.

BACKGROUND

Currently, most if not all friction plates used in automotive transmissions are fabricated from steel stampings.

SUMMARY OF SELECT ILLUSTRATIVE EMBODIMENTS

A friction plate and a method of manufacture thereof wherein the friction plate is fabricated from a thixomolded magnesium or titanium, which is lighter than comparable steel friction plates.

Other illustrative embodiments of the invention will become more apparent to those skilled in the art in view of accompanying drawings and detailed description of the invention.

BRIEF DESCRIPTION OF THE DRAWINGS

FIG. 3 is an enlargement of the core plate shown in FIG. 2 and is a partial sectional view of a friction disc shown in FIG. 1;

FIGS. 4A-4C are partial side elevational views of a portion of a friction pack module utilizing various embodiments of friction plates of the present invention;

FIG. 5 is a view similar to FIG. 1 of an alternative embodiment of a friction plate;

FIG. 6 is an enlarged partial sectional view showing an interface between a core plate and a backing.

DETAILED DESCRIPTION OF THE INVENTION

Figure 1:
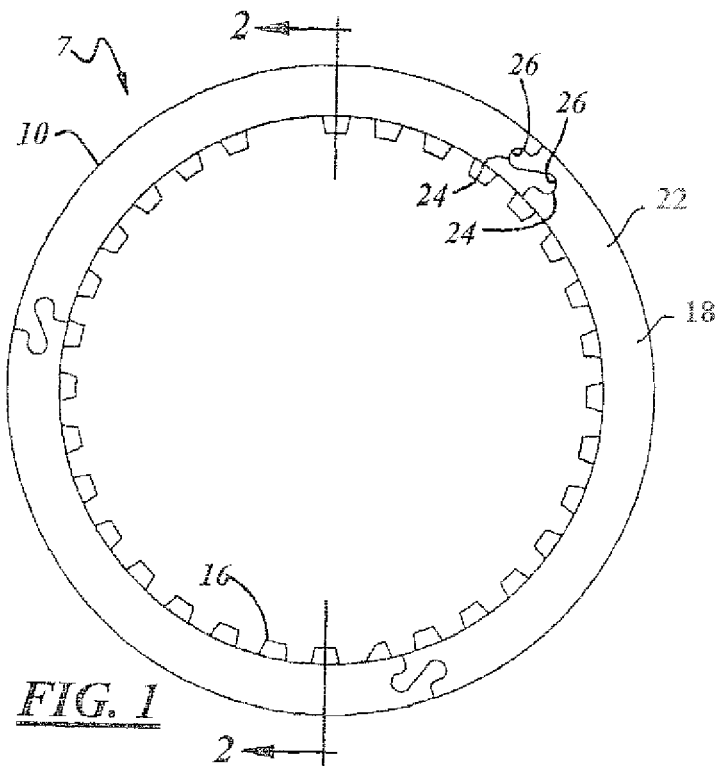
FIGS. 1 and 1A are front elevational views of one embodiment of friction plates.
Figure 2:
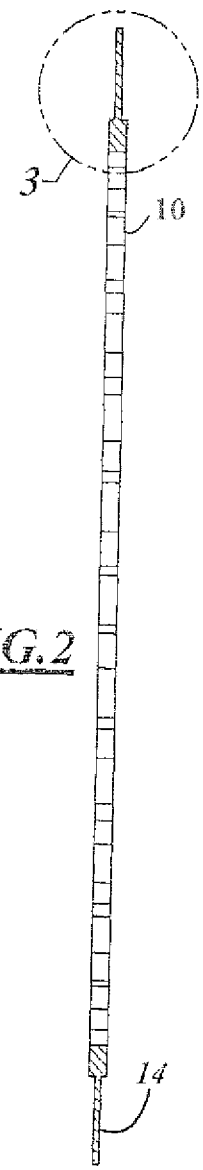
FIG. 2 is a side elevational view of a core plate utilized in the friction plate shown in FIG. 1.

A friction plate 7 is provided in FIG. 1. The friction plate 7 has an annular core plate 10. Preferably, the core plate 10 is fabricated from a thixomolded light but strong material including at least one of titanium or magnesium. Select embodiments may include magnesium alloys AZ91D, AM50 and AM60.

The core plate 10 may have an integral reduced thickness rim portion 14. Typical core plates 10 may have a thickness ranging from 0.76-1.20 mm with an outer diameter of 75 to 225 mm depending upon the application. Core plates outside of this size range are also contemplated.

Figure 1A:
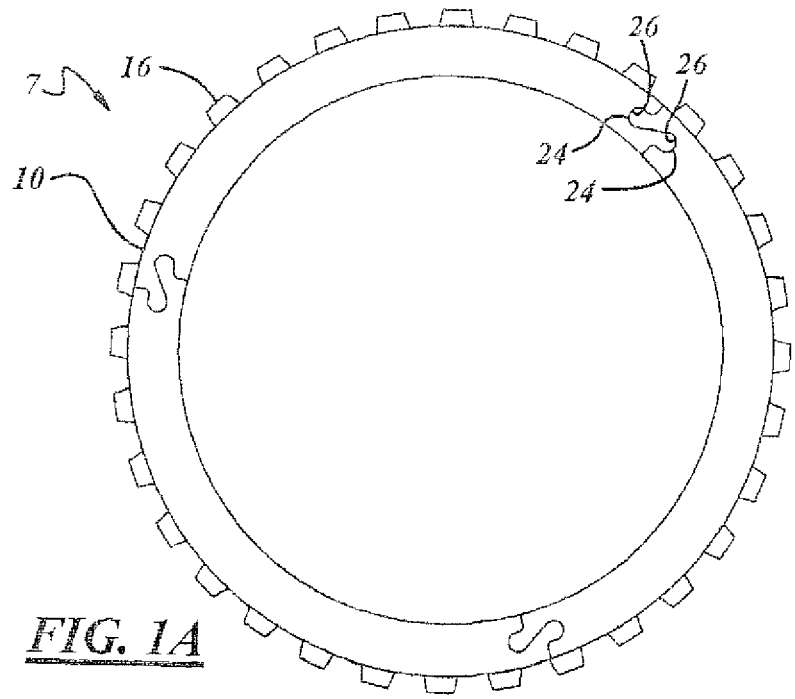

The inner diameter of the typical core plate may have a series of radially inward facing spline teeth 16 (FIG. 1A). Some core plate applications may have radially outward facing spline teeth instead of inward facing spline teeth. The spline teeth 16 provide a torsional interface for the friction plate 7 with a rotating member (not shown). Further, some applications may not have any spline teeth at all.

Connected with the rim 14 is a friction facing 18. The friction facing may be on both sides of the core plate, or only on one side. The friction facing 18 may be a cellulosic fiber base friction material, although other friction materials such as, but not limited to, sintered metals, ceramics, or foam may also be used. As shown, the friction facing 18 may be a paper fiber based friction material. The friction facing may be a continuous ring or may be fabricated from individual arcuate segments arranged radially. In select embodiments the number of segments may be 3-5. The segmenting of the facing 18 provides significant savings in friction material cost. The individual arcuate segments 22 may have interlocking tab 24 and slot 26 end portions. Another segmented facing design provides for independent or non-interlocking facing segment arcs and can provide an oil flow path between facing segments. The friction base facing 18 may be connected with the rim 14 by adhesives or by other means as described herein.

Figure 7:
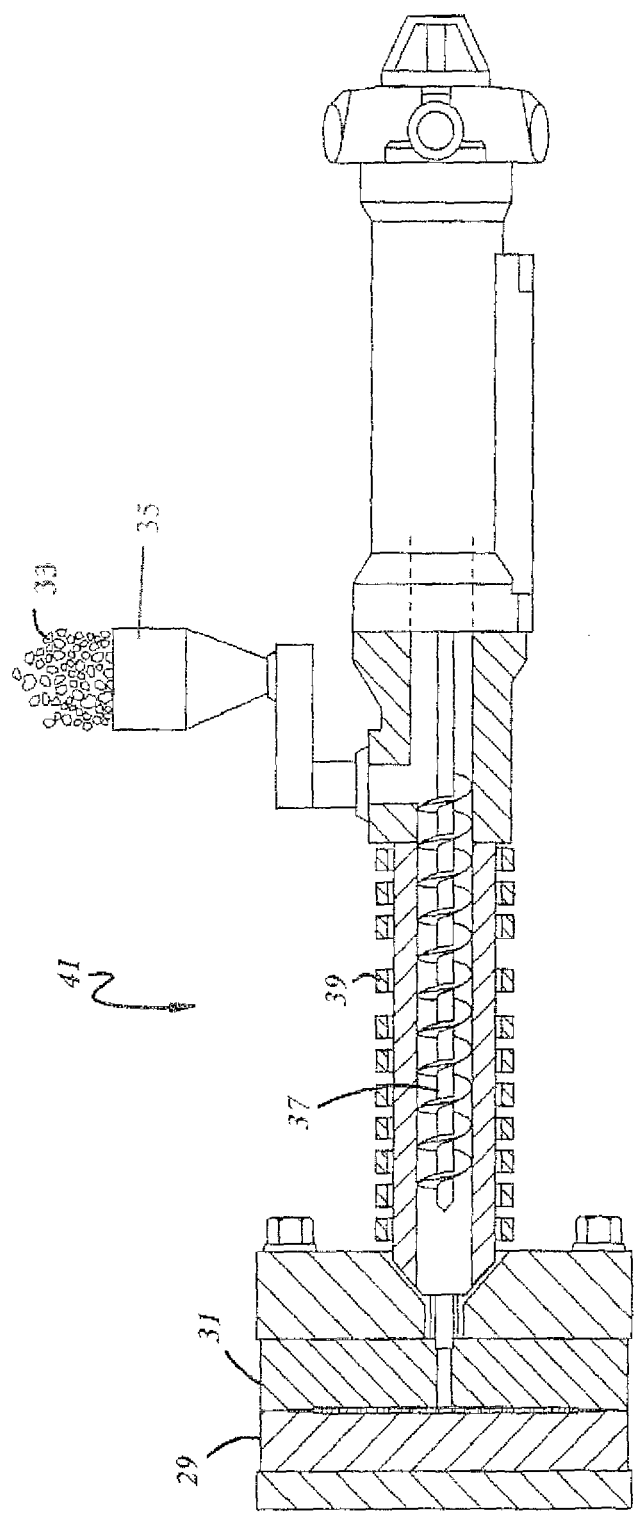
FIG. 7 is a partial sectional view of an injector and mold cavity.

In one embodiment, the facing (full ring or segments) may be first placed in open halves of an injection mold (FIG. 7). The mold halves 29, 31 are closed. In one embodiment, the mold is then pressurized to hold one or both facings in position against a surface of the mold half. In an alternate embodiment, the facing(s) may be held by fixtures and or by a vacuum. Chips 33 including at least one of Magnesium or titanium are dropped into an injection hopper 35 in an inert gas atmosphere. An injector reciprocating screw 37 is encircled by a barrel which in turn is encircled by heater bands 39. In select embodiments, when magnesium is used, the magnesium may be AS91D, AM50 or AM60 or combinations thereof. The magnesium may be brought to a temperature of 1040 to 1080° F. while it is being mixed by reciprocating screw 37 of the injector 41. The magnesium becomes a semi-solid and may have globular dendrites within the melt. Additionally, the flow through the injector nozzle into the mold may be laminar rather than turbulent. In one embodiment, care is taken to keep the temperature of the magnesium beneath 1300° F. wherein magnesium would form a liquid melt and passage through the nozzle of the die could become turbulent. By keeping the molding process thixotropic, porosity is virtually eliminated and additionally, there is less warpage than in a conventional die casting process. The mold temperature may be between 350-480° F. so that as the thixomolded material exits the nozzle, it will be in a consistency of a slurry. As the thixomolded material solidifies and forms the core plate geometry, the fibers 108 of the facing 18 are at least partially encapsulated by the material 112 of the core plate 10, creating a boundary layer 110 and a mechanical bond between facing and core plate.

Referring to FIG. 4A, a partial view of a clutch pack module 27 is provided having two separator plates 34. When the separator plates 34 engage with the friction plate facings, the separator plates 34 are separated by a first distance 36. The thickness of the spline teeth 16 is greater than the thickness of the rim 14, but equal to the final design thickness 36 of the finished friction plate, to provide more strength to the spline teeth 16. Referring to FIG. 4B a clutch module 40 having a friction plate 47 has spline teeth 46 that have a thickness less than the first distance 36. Referring to FIG. 4C a clutch module 50 has a friction plate 57 having spline teeth 56 that are greater width than the first distance 36.

Referring to FIG. 5 a friction plate 67 is provided wherein the friction facing 71 have a plurality of radially extending oil grooves 74. The oil grooves 74 can be formed on the facing 71 before connection with the core plate. In another embodiment, the oil grooves 74 can be cut after connection of the friction facing 71 with the underlying core plate. The cut oil grooves 74 can also extend into the core plate.

In another embodiment, the oil grooves 74 can be formed in the facing 71 and optionally in the core plate in an injection molding operation. The mold cavity is machined with a rib to impart a slightly oversized oil groove to compensate for any spring back in the material.

In another embodiment, the oil grooves can be formed in alternative geometries, such as single direction parallel, double direction parallel (criss-crossed), non-standard linear or non-linear pattern. Oil grooves may extend fully through facing, allowing a through oil passage, or may terminate short of outer diameter to create a dead-end groove.

In another embodiment, the oil grooves may be formed through the use of the injection molding process, whereas the individual, non-connected arcuate segments are positioned with a defined gap between segments into mold, with the molding process forming the core plate and achieving the required bond between friction material and core plate.

IN SELECT EMBODIMENTS

While Illustrative embodiments have been disclosed, it is to be understood it has been described by way of example only, and various modifications can be made.

The invention claimed is:

1. A method of manufacturing a friction plate comprising:
   providing a mold cavity;
   placing a friction facing within said mold cavity; and
   injecting said mold cavity with a thixomold material comprising at least one of magnesium, titanium or alloys thereof, forming a core plate in said mold cavity, and thereby creating a boundary layer and a mechanical bond between the friction facing and the core plate.

2. A method of manufacturing a friction plate as described in claim 1 further including forming ridges in said mold cavity to form oil grooves on said facing within said mold cavity.

3. A method of manufacturing a friction plate as described in claim 2 further including forming ridges in said mold cavity to form oil grooves on said core plate within said mold cavity.

4. A method as set forth in claim 2 wherein said oil groove extends fully through facing.

5. A method of manufacturing a friction plate as described in claim 1, wherein the said material is magnesium and wherein the temperature of said magnesium is brought to a temperature between 1040-1080° F.

6. A method of manufacturing a friction plate as described in claim 5 wherein said magnesium is laminar flow injected into said mold cavity and said mold cavity is at a temperature between 350-480° F.

7. A method as set forth in claim 1 wherein said core plate comprises magnesium or alloys thereof.

8. A method as set forth in claim 1 wherein said friction facing is segmented.

9. A method as set forth in claim 1 wherein said friction facing comprises at least one of cellulosic fiber, sintered metal, ceramic, or foam.

10. A method as set forth in claim 1 wherein said core plate has oil grooves formed thereon.

11. A method as set forth in claim 10 wherein said oil groove is oversized to compensate for any spring back in the material.

12. A method as set forth in claim 1 wherein said core plate has radial spline teeth with a thickness greater than a remainder of said friction plate.

13. A method as set forth in claim 1 wherein said thixomold material comprises at least one of magnesium alloys AS91D, AM50, AM60, or combinations thereof.

14. A method as set forth in claim 1 wherein said thixomold material comprises titanium.

15. A method as set forth in claim 1 wherein the friction facing is encapsulated by the core plate.

16. A method as set forth in claim 1 wherein the mechanical bond is formed along the entirety of the boundary layer.

17. A method as set forth in claim 1 wherein the thixomolded material consists essentially of magnesium, titanium or alloys thereof.

18. A method as set forth in claim 1 wherein said friction facing comprises a cellulosic fiber base friction material.

19. A method as set forth in claim 18 wherein the cellulosic fiber base friction material is encapsulated by the core plate.

20. A method as set forth in claim 18 wherein the fibers of the facing are interspersed with and encapsulated by the material of the core plate in the boundary layer.

21. A method of manufacturing a friction plate comprising:
   providing a mold cavity maintained at a mold temperature between 350-480° F.;
   placing a friction facing within said mold cavity; and
   injecting a thixomold material comprising magnesium at a temperature between 1040-1080° F. and at a laminar flow rate within said mold cavity to form one or more core plates so that a boundary layer and a mechanical bond is created between the friction facing and the one or more core plates and wherein the injected magnesium material has globular dendrites.

22. A method as set forth in claim 21 wherein the mechanical bond is formed along the entirety of the boundary.

23. A method as set forth in claim 21 wherein the thixomolded material consists of magnesium, titanium or alloys thereof.

24. A method as set forth in claim 21 wherein said friction facing comprises a cellulosic fiber base friction material.

25. A method as set forth in claim 24 wherein the cellulosic fiber base friction material is encapsulated by the core plate.

26. A method as set forth in claim 24 wherein the fibers of the facing are interspersed with and encapsulated by the material of the core plate in the boundary layer.

* * * * *